United States Patent

[11] 3,610,774

[72] Inventor Rene Louis Mouille
Aix-En-Provence, France
[21] Appl. No. 871,934
[22] Filed Oct. 28, 1969
[45] Patented Oct. 5, 1971
[73] Assignee Sud-Aviation Societe Nationale de
Constructions Aeronautiques
Paris (Seine), France
[32] Priority Oct. 30, 1968
[33] France
[31] 171,912

[54] ROTORS FOR ROTARY-WING AIRCRAFT
6 Claims, 5 Drawing Figs.
[52] U.S. Cl. ................................................ 416/136,
416/138, 416/174, 416/244
[51] Int. Cl. .................................................... B64c 27/48
[50] Field of Search ........................................... 416/131,
135, 136, 138, 140, 174, 244

[56] References Cited
UNITED STATES PATENTS
2,853,141  9/1958  Leoni .......................... 416/106
2,961,051  11/1960 Wilford et al. ................ 416/131 X
3,465,831  9/1969  Ferris et al. .................. 416/136 X
3,504,989  4/1970  Kisovec ....................... 416/135 X Primary Examiner—Everette A. Powell, Jr.
Attorney—Waters, Roditi, Schwartz & Nissen ABSTRACT: A rotor for rotary-wing aircraft, comprising, for interconnecting a hollow integral rotor-mast—forming at once a shaft, hub and blade-supporting arms—with the blades themselves, a blade-holding sleeve inside such an arm, mounted leaktightly for both rotation and for limited sliding motion authorized by a tie between the sleeve and the attachment core inside the hub, the said tie being inextensible under the effect of centrifugal force but flexible and resilient torsionally.

PATENTED OCT 5 1971 3,610,774

ROTORS FOR ROTARY-WING AIRCRAFT

In U.S. Pat. No. 3,545,880, issued Dec. 8, 1970, there was described a rotor for a rotary-wing aircraft comprising a combination of means for uniting an integral rotor mast, forming at once a shaft, hub and blade-supporting arms, with a special blade attachment, arrangement in which the blade roots are rotatably mounted on the arms and each blade is restrained by a tie member which is for all practical purpose inextensible under the effect of centrifugal force but elastically flexible in torsion, which member unites the root of its associated rotor blade with a central attachment core housed in a widened portion formed at the top of the mast.

The arrangement described in this patent made use of an attachment sleeve at the blade root that covered the arms and was rotatably and slidably mounted thereon.

The present invention relates to an assembly of the same kind but in which the aforesaid sleeve is rotatably mounted leaktightly with the possibility of limited sliding motion inside the arms, thereby enabling the latter to have a form better adapted to its function.

In accordance with this invention, the sleeve is again restrained by a member which is inextensible in response to centrifugal force but is elastically flexible in torsion and which is formed for example by a stack of metal blades. This inextensible member is connected, on the one hand, to the blade support extended by said sleeve, through the medium of a plug, and, on the other hand, adjacent the rotor axis, to a core-forming central member positioned at the top of the mast.

Preferably, the hub is formed with smaller dimensions, being thereby lightened, notably by reducing the distance of the rotor axis and the blade restraining pins.

The arm and sleeve assembly is rendered leaktight by interposed gaskets in order to permit lubrication of the component parts by an oil bath.

The description which follows with reference to the accompanying nonlimitative exemplary drawings will give a clear understanding of how the invention may be carried into practice. In the drawings:

FIG. 1. is a sectional view of a rotor blade attachment device, taken through both the axis of the integral mast and the axis of one of its arms.

Figure 1:
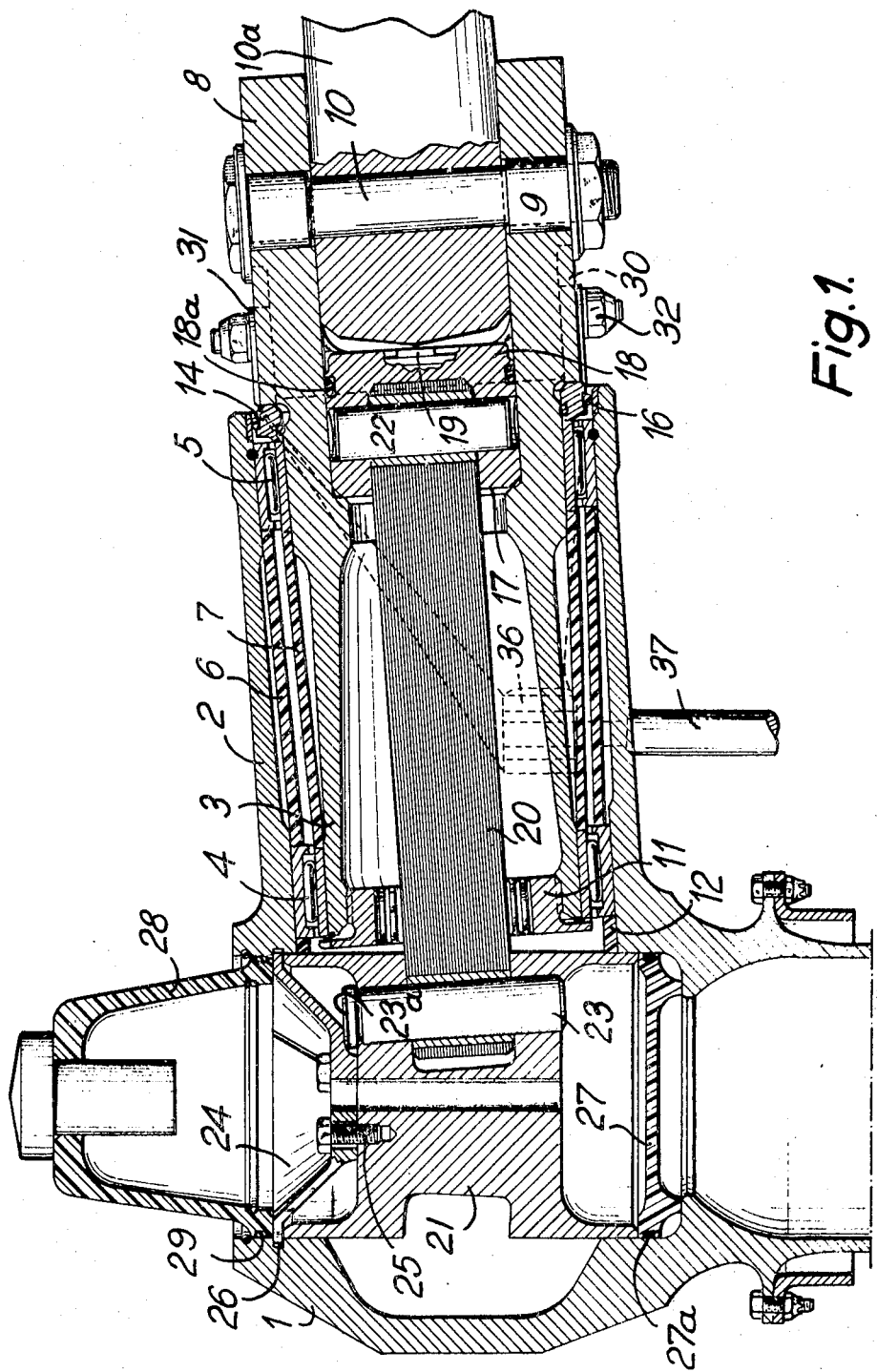

The device shown in the drawings includes a rotor mast 1 formed as a hollow integral part and embodying at its top a number of arms 2 equal to the number of blades on the rotor.

Within each arm 2 is pivotally mounted with limited sliding motion a blade holding sleeve 3. Needle bearings 4 and 5 having their races separated by distance-pieces 6 and 7 preferably made of plastic, which restrain and at the same time permit the rotation of sleeve 3 in arm 2 and the said limited sliding motion.

Blade-holding sleeve 3 is formed at its outer end with a clevis 8 each flange of which is formed with holes therein lined with bushes 9 for receiving the pins 10 for securing the blade 10a.

Figure 4:
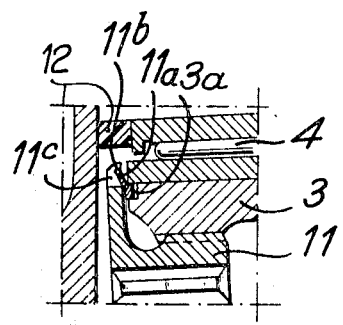
FIG. 4 shows on an enlarged scale the retaining device for the collar used to restrain the inner race of a needle bearing on the sleeve.

At its end adjacent the axis of the rotor-hub-forming mast, the inner race of bearing 4 is retained by the collar of a ring 11 which is screwed into sleeve by means of the tool insertion splines with which its bore is provided, the ring 11 being locked by a keeper 11a which has a tab portion thereof inserted into a notch 3a on the inner end section of sleeve 3, a countertab 11b being inserted into a notch 11c formed on said collar (see FIGS. 1 and 4).

The outer race of bearing 4 abuts against a washer 12 made of a plastic of the superpolyamide type such as nylon, said washer 12 having edges shaped to form an abutment against the lateral region of a central core (to be described hereinafter) and against said bearing race 4, having regard for the ascending obliquity of the axis of arm 2 in relation to the normal to the rotor mast axis.

Figure 5:
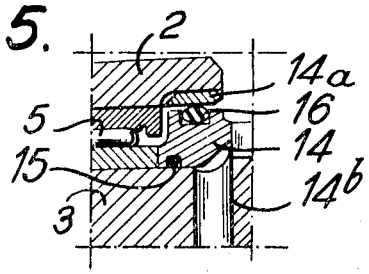
FIG. 5 is a corresponding detail showing on an enlarged scale of the opposite retention means and the gaskets it supports.

At the blade end, the inner race of bearing 5 bears against a ring 14 (See FIGS. 1 and 5) of appropriate section, which is in pressure contact against the end-section of bearing race 5, against a corresponding external bearing surface of sleeve 3 and inside a ring 14a fitted into an end bore in arm 2, and against a shoulder 14b formed, with an interposed groove of rounded profile, in the region where the cylindrical-bearing surface of sleeve 3 joins with the root portion of clevis 8.

Ring 14 is formed internally with a groove which receives a sealing O-ring 15 on said bearing surface and externally with a groove which receives an O-ring 16 of oval section that ensures leaktightness between ring 14 and ring 14a. The O-ring 16 ensures leaktightness both in rotation and in axial sliding motion.

Figure 2:
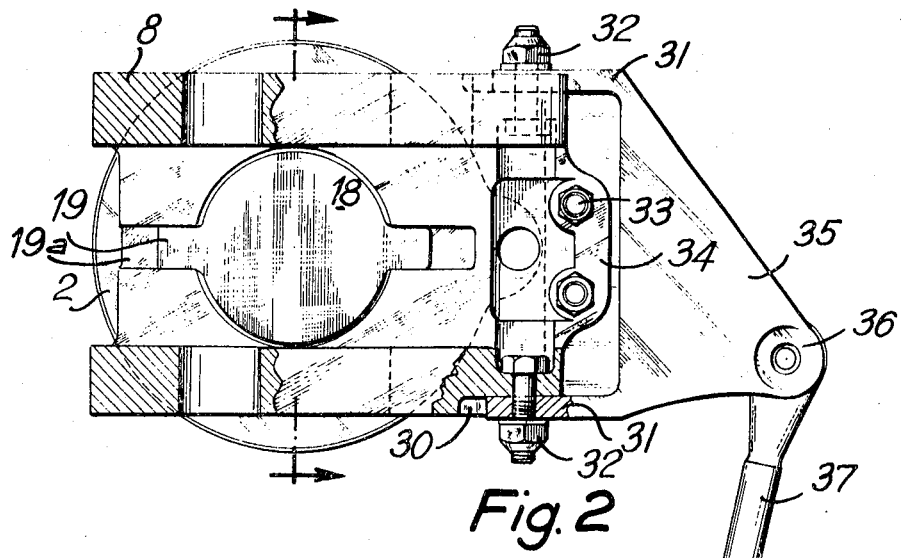
FIG. 2 is an end view, facing the clevis, of the end of an arm, with partial cutaway portions.
Figure 3:
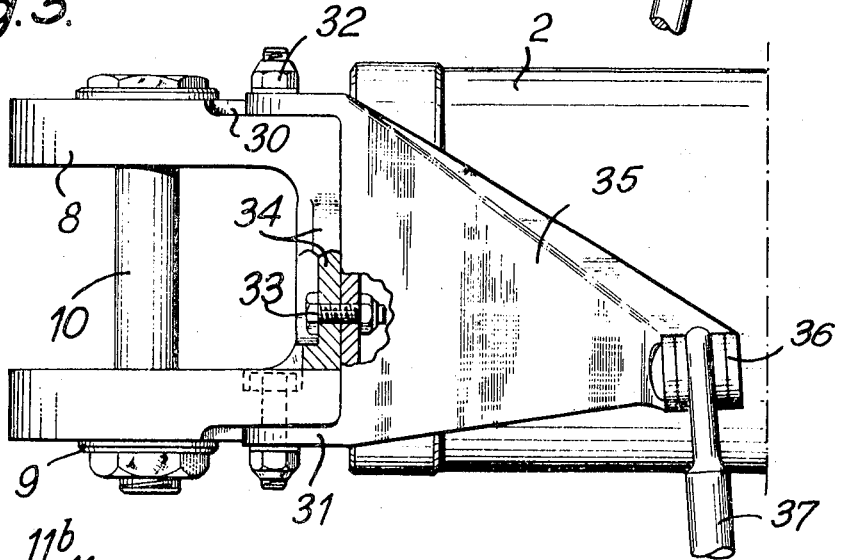
FIG. 3 is a detail view of the end of an arm considered from the rear portion of FIG. 1.

Within sleeve 3, beneath said bearing surface receiving the bearing 5, is a reinforcement which gives form to a shoulder 17 forming an abutment for a plug 18 from the front face of which project two diametrically opposed lobes 19 which coact with corresponding recesses 19a in the bottom of clevis 8 (FIGS. 1 and 2) to angularly unite clevis 8 with sleeve 3 and ultimately blade 10a with hollow arm 2.

Interposed between plug 18 and a central core 21, inside the sleeve, is a tie system 20 formed of a stack of metal strips forming an assembly which is inextensible in response to centrifugal forces but flexible and resilient torsionally. Said tie system is formed with a hole extending therethrough at each end, the hole adjacent the plug 18 receiving a pin 22 held captive in the corresponding bore of sleeve 3 into which said plug 18 is inserted, and the hole adjacent the core 21 receiving a pin 23 formed with a head 23a. Thus, through the agency of pins 22 and 23, tie system 20 and plug 18, the central core 21, the sleeve 3, its clevis 8 and ultimately the blade 10a are rigidly united.

For the purpose of ensuring that the several pins 23 are restrained by their associated heads 23a, core 21 has bearing thereagainst a sectorial cup 24 made up of three cup sections which are individually fixed to the core end-section by bolts 25 and which in so doing clamp the heads 23a immovably between the cup sections and the core. The cup sections are inserted in succession by their edges into a groove 26 and, once bolted down, restrain both the core 21 and the pins 23.

Plug 18 is formed with a groove for receiving an O-ring 18a, whereby each sleeve 3 is obturated internally. Further, within a lodging at the top of mast 1 is provided a plastic seal-holder 27 which limits the movements of core 21 in the bearing surfaces of the mast and which, through the agency of a seal 27a positioned in a groove formed in the seal-holder 27, ensures leaktightness for an oil reservoir formed thus in the mast head and closed at the opposite end by a dome 28 made of preferably transparent plastic, said dome being applied via a seal 29 on its skirt against the orifice of the reservoir, restrained by a circlip, and closed finally by a level-indicating plug.

In addition, through the medium of notches 30 cut into the flanges of clevis 8, the rear portions of said flanges receive a fork 31 forming a termination for an arm secured by bolts 32 (and associated nuts) extending through reduced portions of said flanges and of the prongs of said fork, and also by bolts 33 (and associated nuts) extending a web at the bottom of the fork and a lug 34 formed by a lateral extension at the bottom of the clevis and embodying suitable protrusions and reduced portions on said bottom. The arm 35 rigid with the fork envelops arm 2 in spaced relationship therewith and, when fitted on, forms at its end a clevis 36 for receiving a link 37 for controlling the angle of incidence of the blade 10a.

By comparison with the subject of the aforesaid U.S. Pat. application Ser. No. 746,852, the form of embodiment hereinbefore disclosed offers additional advantages, including the followings:

The fact that sleeve 3 and its plug 18 are disposed internally of arm 2 makes it possible to move the blade attachment point as close as possible to the hub-mast rotation axis, which is a factor favorable to the dynamic stability of the rotor and to the reduction of centrifugal loads.

Since the sleeve 3 is located internally of arm 2, the connection between the latter and the mast can be provided with sections of material as large as may be desired, since the entirety of its outer surface is clear (to an extent compatible with the various other factors to be taken into consideration in this type of structure). This results in reduced stresses in this critical area and hence in improved fatigue strength.

The full mastery achieved thus for configuring this particular zone makes it possible to provide the latter with a contouring enabling the evolution in rigidity between the blade attachment and the mast to be made more progressive.

This results in the possibility of reducing the weight of the mast-sleeves assembly.

It goes without saying that many changes and substitutions of parts may be made to the above described embodiments without departing from the scope of the invention.

I claim:

1. In a rotor for a rotary-wing aircraft devoid of flapping and drag hinges in the connection between rotor blades and hub, said rotor including a one-piece hollow mast forming simultaneously a drive shaft, a hub and blade supporting arms, each said arm receiving an associated blade for rotatable and slidable engagement therein, each blade including a sleeve formed on its root, a tie system retaining each blade in said sleeve and formed by a nonextensible but torsionally and elastically deformable member attached to a central core located within an upper widened portion of said mast, the improvement which comprises, in combination and in respect to each said rotor blade, a blade holder sleeve mounted within the associated arm, rotation and sliding motion imparting means positioned between said arm and said sleeve, a tie member disposed within said sleeve and said arm, a plug member for fastening said tie member to said sleeve so as to be angularly rigid therewith, and sealing means between said arm and said sleeve.

2. In a rotor as claimed in claim 1, an attachment member fastened to a central core located within an upper widened portion of said mast, with an associated fastening pin located as close as possible to the rotation axis of said mast and comprising means for restraining said pin axially with respect both to said mast and to said core.

3. In a rotor as claimed in claim 2, means for axially restraining said pin formed by a plurality of cup sections assembled to form a cup-shaped member having its bottom bearing against head portions of said pins, which heads bear against said core, said cup sections each comprising and edge inserted into a corresponding groove formed on said mast and each being bolted to said core.

4. In a rotor as claimed in claim 1, a blade attachment clevis on said sleeve, said clevis supporting, adjacent the corresponding arm end, a fitted lever enveloping said arm in spaced-relationship therewith and terminating in a clevis to which a blade-pitch control line is rotatably connected.

5. In a rotor as claimed in claim 1, needle bearing interposed between said arm and said sleeve, bilateral locating means for the inner races thereof, plastic distance-pieces positioned between the outer races and between the inner races respectively of said bearings, and a profiled distance-piece likewise made of plastic and against which thrusts the outer race of the associated needle bearing.

6. In a rotor as claimed in claim 5, sealing means comprising, in each arm and each sleeve, an internal seal therebetween, two outer seals applied against said sleeve and inside said arm respectively and housed in an outer locating distance-piece for said needle bearings, a seal-holder within said hub, located beneath said core and associated to a seal interposed between said seal-holder and said hub, and a lubricating-oil storage dome seal located between said dome and said hub and positioned, together with said dome, above said core.